US011789231B2

(12) United States Patent
Nolf

(10) Patent No.: US 11,789,231 B2
(45) Date of Patent: Oct. 17, 2023

(54) REMOTE RETRACTABLE MIRROR

(71) Applicant: CNH Industrial America LLC, New Holland, PA (US)

(72) Inventor: Stefaan Nolf, Drongen (BE)

(73) Assignee: CNH Industrial America LLC, New Holland, PA (US)

( * ) Notice: Subject to any disclaimer, the term of this patent is extended or adjusted under 35 U.S.C. 154(b) by 104 days.

(21) Appl. No.: 17/563,265

(22) Filed: Dec. 28, 2021

(65) Prior Publication Data
US 2022/0121003 A1 Apr. 21, 2022

Related U.S. Application Data

(63) Continuation of application No. PCT/EP2020/067931, filed on Jun. 25, 2020.

(30) Foreign Application Priority Data

Jun. 28, 2019 (EP) .................................... 19183200

(51) Int. Cl.
*G02B 7/182* (2021.01)
*B60R 1/06* (2006.01)
*B60R 1/074* (2006.01)

(52) U.S. Cl.
CPC .......... *G02B 7/1821* (2013.01); *B60R 1/0612* (2013.01); *B60R 1/074* (2013.01)

(58) Field of Classification Search
CPC ... G02B 7/1821; B60R 1/0612; B60R 1/0617; B60R 1/074

(Continued)

(56) References Cited

U.S. PATENT DOCUMENTS 2,458,117 A * 1/1949 Tolbert .................. B60R 1/0605
248/213.1
2,570,536 A * 10/1951 Fellabaum .............. B60R 1/078
248/480

(Continued)

FOREIGN PATENT DOCUMENTS

DE 90 07 671 U1 12/1993
DE 20 2010 008 150 U1 12/2010

(Continued)

OTHER PUBLICATIONS

Notification of Transmittal of the International Search Report and the Written Opinion of the International Searching Authority, or the Declaration dated Aug. 14, 2020 for International Application No. PCT/EP2020/067931 (11 pages).

(Continued)

*Primary Examiner* — Ricky D Shafer
(74) *Attorney, Agent, or Firm* — Peter Zacharias

(57) ABSTRACT

A mirror assembly for a work vehicle includes an elongated support beam, a detent joint connected to the elongated support beam, at least one support arm rotationally connected to the detent joint, at least one mirror connected to the at least one support arm, and an actuator for adjusting a position of the at least one mirror relative to the elongated support beam. The detent joint includes a detent bracket which is rotatable about the axis of rotation. The actuator is connected in between the elongated support beam and the detent bracket such that the at least one support arm is rotatable about the axis of rotation by the actuator.

15 Claims, 7 Drawing Sheets

(58) Field of Classification Search
USPC .................................................. 359/841, 877
See application file for complete search history.

(56) References Cited

U.S. PATENT DOCUMENTS

| | | | | |
|---|---|---|---|---|
| 2,839,965 | A | * | 6/1958 | Budreck ................. B60R 1/078 D12/187 |
| 3,480,355 | A | | 11/1969 | Smith |
| 3,492,065 | A | | 1/1970 | Kurz, Jr. |
| 3,624,818 | A | * | 11/1971 | Stanfield ............... B60R 1/0615 92/13.4 |
| 4,558,930 | A | | 12/1985 | Deedreek |
| 5,107,374 | A | * | 4/1992 | Lupo ..................... B60R 1/0617 248/478 |
| 5,268,796 | A | * | 12/1993 | Tomerlin .............. B60R 1/0612 359/873 |
| 5,880,895 | A | * | 3/1999 | Lang ..................... B60R 1/0617 359/881 |
| 7,178,925 | B1 | | 2/2007 | Tidwell |
| 2003/0103282 | A1 | * | 6/2003 | Schmidt ................ B60R 1/0605 359/872 |
| 2004/0051983 | A1 | * | 3/2004 | Lang ..................... B60R 1/0605 359/841 |
| 2004/0075922 | A1 | | 4/2004 | Serrano Fernandez et al. |
| 2009/0135509 | A1 | * | 5/2009 | Englander ............. B60R 1/0617 359/841 |
| 2017/0327040 | A1 | | 11/2017 | Ervin et al. |

FOREIGN PATENT DOCUMENTS

| | | |
|---|---|---|
| EP | 2 077 205 A2 | 7/2009 |
| EP | 2 759 446 A1 | 7/2014 |
| WO | 2010/108933 A1 | 9/2010 |

OTHER PUBLICATIONS

Extended European Search Report dated Jan. 14, 2020 for European Patent Application No. 19183200.5 (4 pages).

* cited by examiner

REMOTE RETRACTABLE MIRROR

CROSS REFERENCE TO RELATED APPLICATION

This is a continuation of PCT application No. PCT/EP2020/067931, entitled "REMOTE RETRACTABLE MIRROR", filed Jun. 25, 2020, which is incorporated herein by reference. PCT application no. PCT/EP2020/067931 claims priority to European patent application no. EP 19183200.5, entitled "REMOTE RETRACTABLE MIRROR", filed Jun. 28, 2019, which is incorporated herein by reference.

FIELD OF THE INVENTION

The present invention relates to work vehicles, and, more specifically to work vehicles with adjustable mirrors.

BACKGROUND OF THE INVENTION

Work vehicles, such as an agricultural harvester, windrower, tractor, etc., generally include a chassis, a prime mover, wheels for supporting the chassis, a cab, and an indirect vision, i.e., mirror, assembly with rearview and sideview mirrors. The sideview mirrors are typically mounted onto each side of the work vehicle and extend laterally, outwardly therefrom to augment the field of view. The sideview mirrors may be retractable in order to reduce the overall profile of the work vehicle. The sideview mirrors may slide inwardly and outwardly on telescoping rods and/or fold, e.g. rotate, inwardly and outwardly from the side of the work vehicle.

The sideview mirrors may be manually or automatically positioned in between an extended position and a retracted position. For example, an operator may need exit the work vehicle and manually extend and retract the sideview mirrors. Alternatively, some mirror assemblies may include an actuator for automatically extending and retracting the sideview mirrors. However, such automatic mirror assemblies may be costly and cumbersome.

EP 2077205 discloses a mirror assembly with multiple, internal pivot plates that dually hold the mirror in place yet also allow for the mirror to rotate upon the exertion of a sufficient force. The pivot plates carry the support arms of the mirrors. The pivot plates each have protruding teeth and grooves that engage with one another so that a pivot gap is defined in between the pivot plates. The pivot gap allows for the plate to slide relative to one another, and thereby allow the mirrors to be rotated inwardly and outwardly.

EP 2759446 discloses a mirror assembly with automatically extendable mirrors. The mirror assembly includes a base part, a rotary part, an electric rotary drive connected with the base part and rotary part, and a coupling device that is located in between and selectively couples the base part and rotary part.

DE 202010008150 discloses an automatically extendable mirror assembly. The mirrors are attached to a pivotable linkage attached to the side of the work vehicle. The pivotable linkage is rotated by a double-acting piston-cylinder, which is connected in a triangular fashion between the side of the work vehicle and the pivotable linkage.

What is needed in the art is a cost-effective, automatically adjustable mirror assembly.

SUMMARY OF THE INVENTION

The present invention provides a mirror assembly for automatically extending and retracting one or more mirrors of the work vehicle. The mirror assembly includes a detent joint with a detent bracket and a linear actuator connected to the detent bracket. As the linear actuator extends and retracts, the detent bracket translates the linear motion into a corresponding rotational movement of the mirrors.

The invention in one form is directed to a mirror assembly for a work vehicle. The mirror assembly includes an elongated support beam having an end, a detent joint connected to the end of the elongated support beam and defining an axis of rotation, at least one support arm rotationally connected to the detent joint, at least one mirror connected to the at least one support arm, and an actuator for adjusting a position of the at least one mirror relative to the elongated support beam. The detent joint includes a detent bracket which is rotatable about the axis of rotation. The actuator is connected in between the elongated support beam and the detent bracket such that the at least one support arm is rotatable about the axis of rotation by the actuator.

In one exemplary embodiment, the actuator is a linear actuator which includes a first end connected to the elongated support beam and a second end connected to the detent joint such that as the actuator extends and retracts the at least one support arm rotates about the axis of rotation.

In another exemplary embodiment, the actuator is operable in a reset mode for resetting an operating position of the at least one mirror after the at least one mirror and the at least one support arm are undesirably moved. In the reset mode the actuator performs a double-action reset procedure by initially retracting to reset a relative position of the at least one support arm relative to the actuator and subsequently extending to reposition the operating position of the at least one mirror.

In yet another exemplary embodiment, the detent joint further includes a joint body, a rod, and at least one detent element internally disposed within the joint body.

In yet another exemplary embodiment, the detent bracket includes a first end for mating with the at least one detent element and a receiving hole for receiving the rod and connecting to the joint body, an elongated middle portion, and a second end that is connected to the actuator.

In yet another exemplary embodiment, the detent bracket is connected in between the joint body and the at least one support arm.

In yet another exemplary embodiment, the rod of the detent joint includes a receiving hole and the at least one support arm is fastened to the rod.

In yet another exemplary embodiment, the mirror assembly further includes a mechanical stop connected to the elongated support beam and configured for limiting an inward rotation of the at least one support arm.

In yet another exemplary embodiment, the mechanical stop is connected to the end of the elongated support beam and includes a curved middle portion and a bent end tab for contacting the at least one support arm.

In yet another exemplary embodiment, the at least one mirror includes a first mirror and a second mirror. The at least one support arm includes a multi-part support arm with an upper support arm member connected to the second mirror and a lower support arm member connected to the first mirror.

In yet another exemplary embodiment, the actuator is an electric cylinder.

In yet another exemplary embodiment, the mirror assembly further includes a protective cover for housing and protecting at least a portion of the actuator and the elongated support beam.

In yet another exemplary embodiment, the protective cover includes a shell body with a receiving slot for receiving the elongated support beam and a receiving hole for receiving the actuator.

In yet another exemplary embodiment, the protective cover further includes a hole cover member connected to the receiving hole and a seal member connected to the hole cover member for sealably surrounding the actuator.

In yet another exemplary embodiment, the mirror assembly further includes an electronic control unit operably connected to the actuator and a user interface operably connected to the electronic control unit. The user interface is configured for receiving an input command and sending a control signal to the electronic control unit. The at least one mirror is automatically adjusted by the electronic control unit upon receiving the control signal.

An advantage of the present invention is that the mirror assembly automatically adjusts a position of the mirrors by extending or retracting the actuator upon receiving an input command from an operator.

Another advantage is that the mirror assembly may be automatically reset by performing a reset procedure in order to reposition their mirrors in their operating position after the mirrors have been undesirably moved by contacting an object.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "forward", "rearward", "left" and "right", when used in connection with the work vehicle and/or components thereof are usually determined with reference to the direction of forward operative travel of the agricultural vehicle, but again, they should not be construed as limiting.

Figure 3:
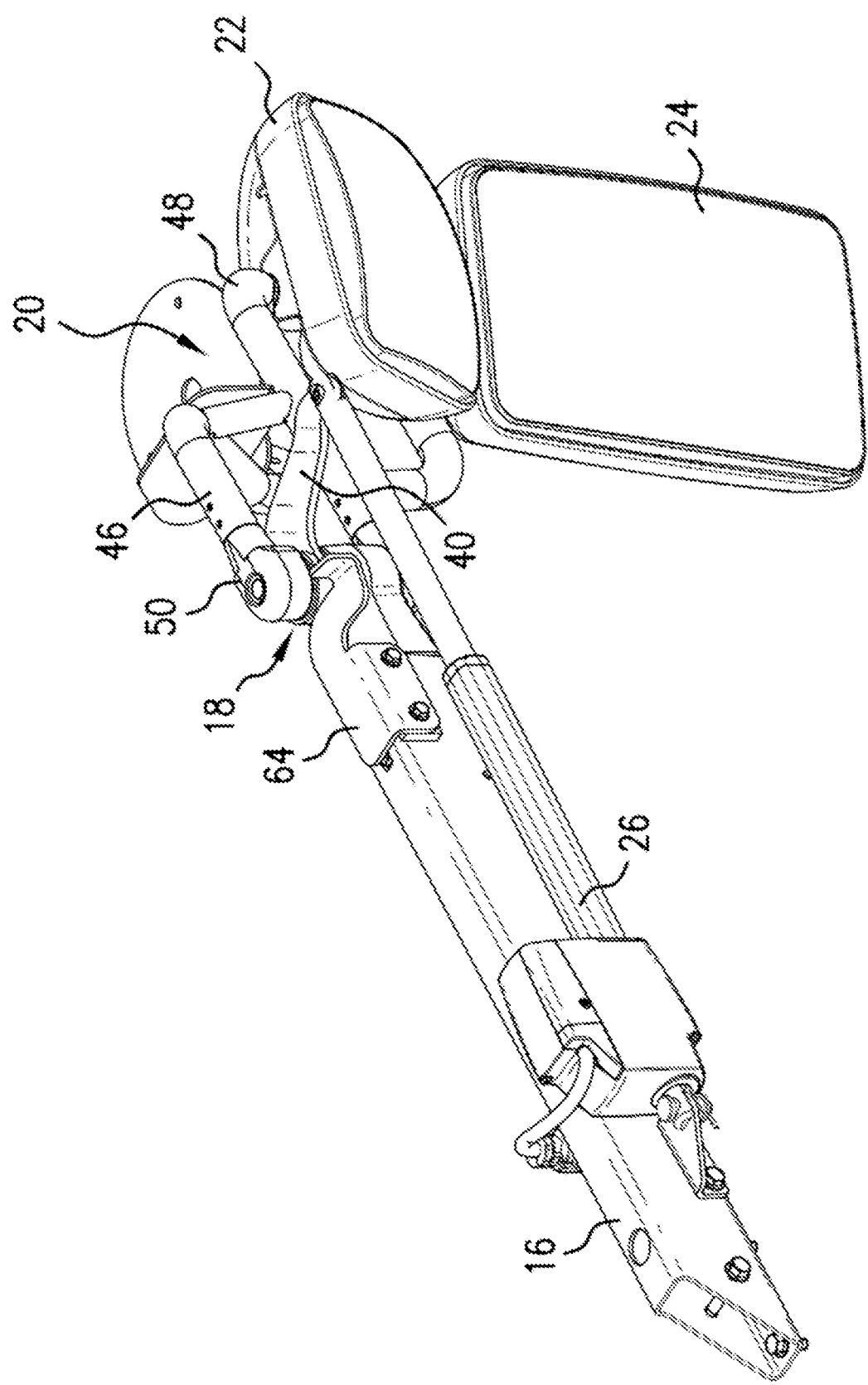
FIG. 3 is a perspective view of the retractable mirror assembly in an extended position.

Referring now to the drawings, and more particularly to FIGS. 1-4, there is shown a retractable mirror assembly 10 for a work vehicle 12. The retractable mirror assembly 10 generally includes a mounting hinge 14, an elongated support beam 16, a detent joint 18, at least one support arm 20, at least one mirror 22, 24, and an actuator 26 for automatically positioning the at least one mirror 22, 24 in between a completely retracted position (FIG. 2) and an extended position (FIG. 3). The retractable mirror assembly 10 may also include a protective cover 28 for housing and protecting the elongated support beam 16 and actuator 26. Furthermore, the retractable mirror assembly 10 may also include an electronic control unit (ECU) 30, with a memory 32, and a user interface 34 so that the operator may input a control command and thereby the ECU 30 may accordingly adjust the position of the at least one mirror 22, 24.

The work vehicle 12 may include only one or multiple retractable mirror assemblies 10. For example, the work vehicle 12 may include a pair of retractable mirror assemblies 10 respectively mounted onto the sides thereof. The work vehicle 12 may be in the form of any desired vehicle, such as an agricultural vehicle, for example a combine harvester, tractor, or a windrower. For instance, the work vehicle 12 may be a combine harvester which generally includes a chassis, wheels, a prime mover, a feeder housing, a threshing and separating system, a cleaning system, and a header removably attached to the feeder housing.

The mounting hinge 14 pivotally connects the elongated support beam 16 to the side of the work vehicle 12. The mounting hinge 14 may be in the form of any desired hinge 14. In an alternative embodiment, the mounting hinge 14 may instead be in the form of a fixed bracket.

The elongated support beam 16 is connected in between the mounting hinge 14 and the detent joint 18. The distal end of the elongated support beam 16 receives and mounts the detent joint 18. The elongated support beam 16 may also mount the actuator 26. The elongated support beam 16 is shown a rectangular beam; however, the elongated support beam 16 may be in the form of any desired support member which has any desired cross-sectional shape. As can be appreciated, the elongated support beam 16 may have one or more receiving holes for mounting the detent joint 18 and actuator 26.

Figure 4:
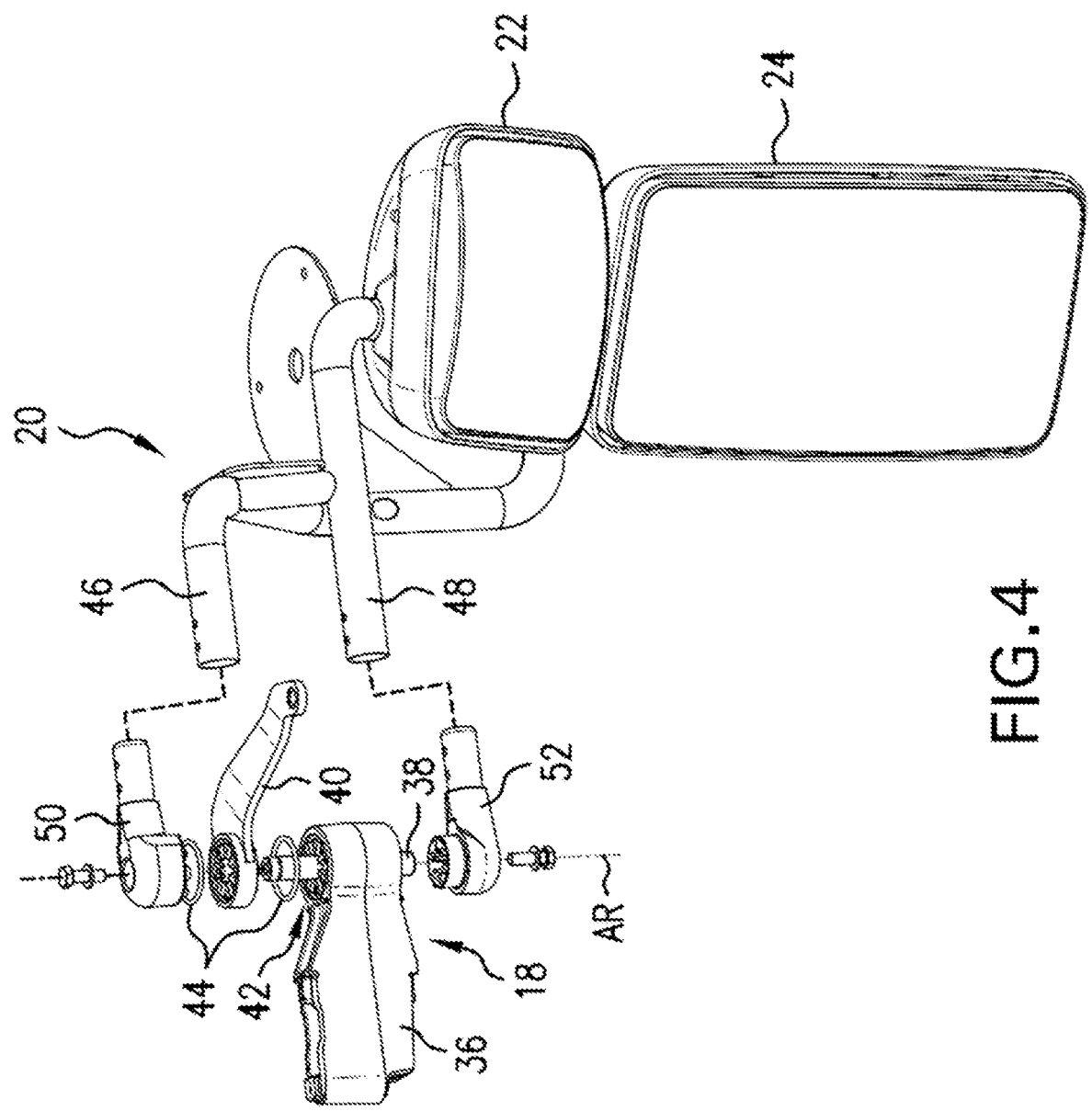
FIG. 4 is an exploded view of the mirror support arm and the detent joint of the retractable mirror assembly.

The detent joint 18 generally includes a joint body 36, a rod 38, a detent bracket 40, and at least one detent element 42. The detent joint 18 defines an axis of rotation AR (FIG. 4). The joint body 36 may have a rectangular proximal end for connecting to, for example inserted within and fastened to, the distal end of the elongated support beam 16, and a circular or tubular end for mounting the rod 38, the detent bracket 40, and the at least one detent element 42. The rod 38 may vertically oriented and thus define the axis of rotation AR about which the bracket 40 rotates. The rod 38 may also include a threaded receiving hole at each lateral end for receiving the at least one support arm 20. In this regard, the at least one support arm 20 may be fastened to the rod 38, and hence movably connected to the detent joint 18, by one or more fasteners (unnumbered). The detent bracket 40 includes a first end with protrusions, e.g. teeth, for mating, with the at least one detent element 42 and a receiving hole for receiving the rod 38 and connecting to the joint body 36 (unnumbered). The detent bracket 40 also includes an elongated middle portion and a second end with a receiving hole for connecting the actuator 26. The detent bracket 40 is connected in between the joint body 36 and the at least one support arm 20. The at least one detent element 42 includes a receiving hole for receiving the rod 38 and protrusions, e.g. teeth, for mating with the protrusions of the detent bracket. The at least one detent element 42 is housed within the joint body 36. The at least one detent element 42 may be in the form of a toothed disc. The at least one detent element 42 may be a single, monolithic element with upper and lower teeth for dually mating with the detent bracket 40 and the at least one support arm 20. Alternatively, the at least one detent element 42 may be in the form of two or more toothed discs. It should be appreciated that the joint body 36, the rod 38, the detent bracket 40, and the detent element 42 may comprise any desired material, such as metal and/or plastic. The detent joint 18 may also include one or more gaskets in the form of rubber O-rings 44.

Thereby, the detent joint 18 allows for positioning and maintaining the mirrors 22, 24 in a desired position, via the mating of the respective protrusions of the detent bracket 40 and the detent element 42. Since the detent bracket 40 is rotatable about the axis of rotation AR, as the actuator 26 extends and retracts the linear forces acting on the detent bracket 40 are translated into a rotational movement of the at least one support arm 20. The detent joint 18 also allows for slippage between the detent bracket 40 and the detent element 42 to allow the mirrors 22, 24 to move, i.e., break-away, upon coming into contact with an object.

The at least one support arm 20 is rotationally connected to the detent joint 18. The at least one support arm 20 may be in the form of a multi-part support arm 20 with an upper support arm member 46 and a lower support arm member 48 connected to one another. Alternatively, the at least one support arm 20 may be in the form of only one support arm for mounting one or more mirrors 22, 24. The at least one support arm 20 may include an upper and lower mounting head 50, 52 for respectively connecting the upper and lower support arm members 46, 48 (FIG. 4). The mounting heads 50, 52 may also include protrusions, e.g. teeth, for respectively engaging with the detent bracket 40 and the lower side of the detent element 42.

The at least one mirror 22, 24 is connected to the at least one support arm 20. As shown, each mirror assembly 10 includes a pair of upper and lower mirrors 22, 24. The upper mirror 22 may be connected to the lower support arm member 48, and the lower mirror 24 may be connected to the upper support arm member 46.

The actuator 26 adjusts a position of the mirrors 22, 24 relative to the elongated support beam 16. The actuator 26 may be a linear actuator 26 that includes a first end connected to the side of the elongated support beam 16 and a second end connected to the detent joint 18, by way of the detent bracket 40. Thus, as the actuator 26 extends and retracts, the at least one support arm 20 rotates about the axis of rotation AR via the detent bracket 40. The actuator 26 may be in the form of any desired linear actuator, such as an electric cylinder 26.

Figure 1:
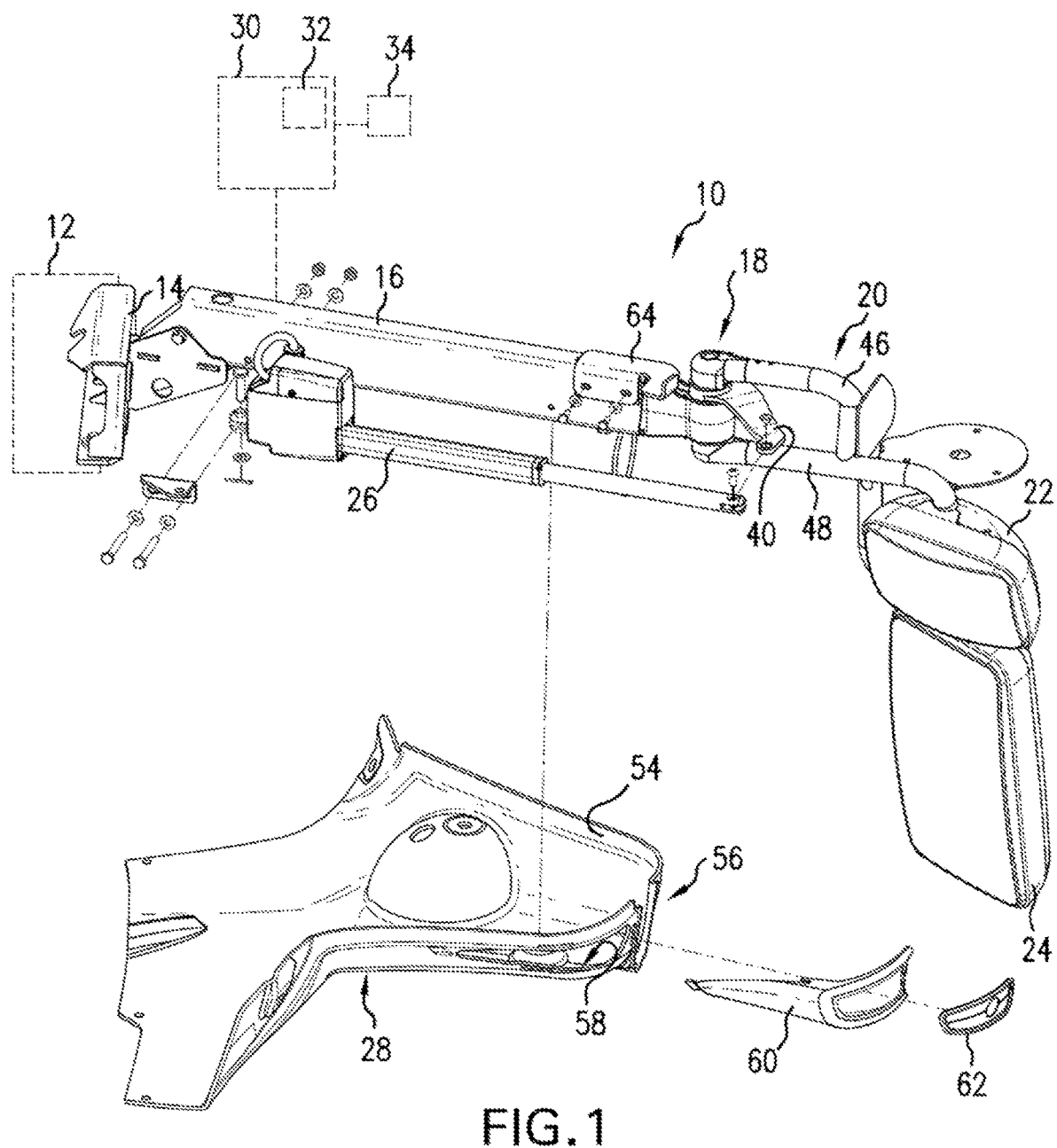
FIG. 1 is a perspective and partially exploded view of an embodiment of a retractable mirror assembly for an agricultural vehicle.
Figure 2:
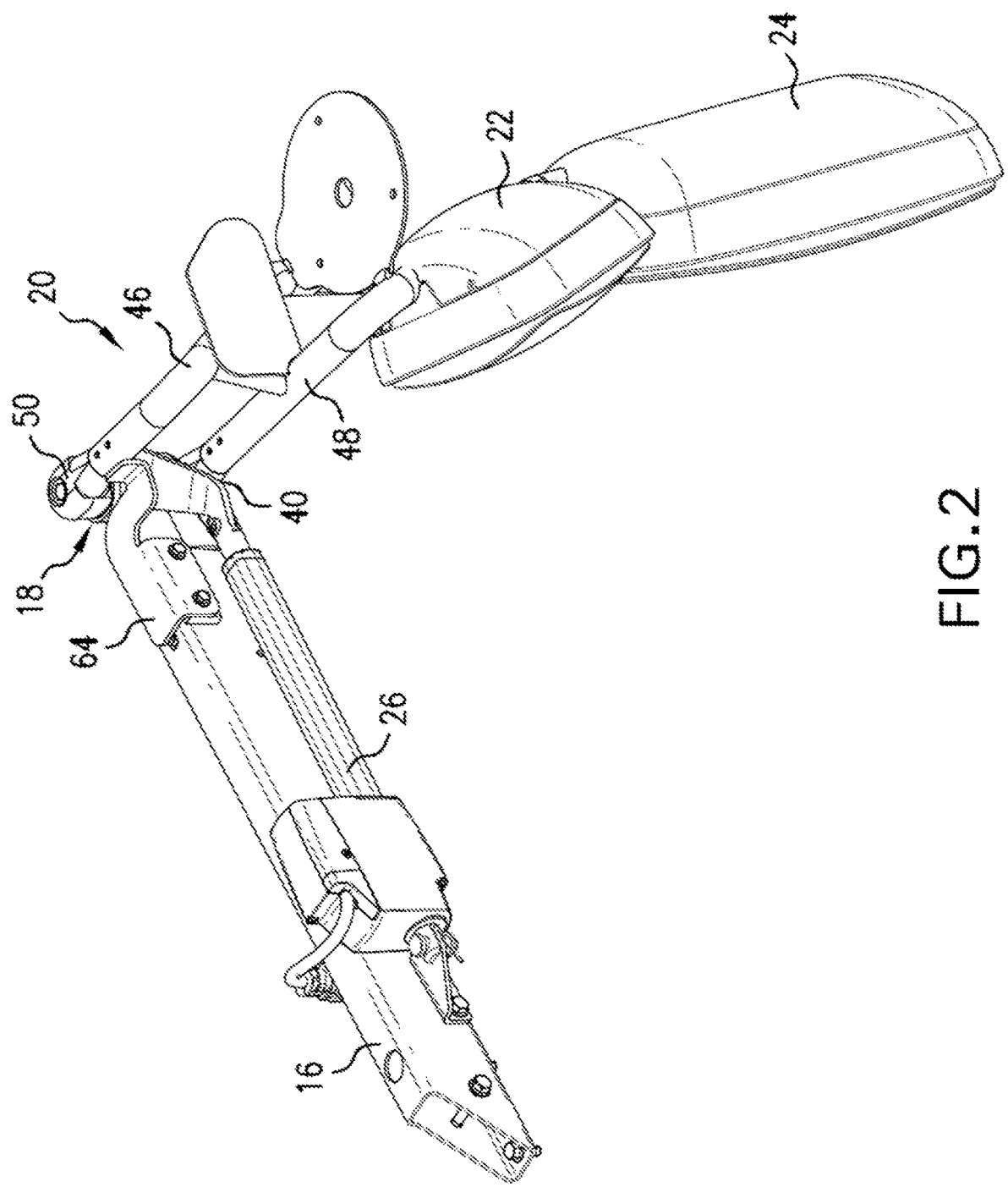
FIG. 2 is a perspective view of the retractable mirror assembly in a retracted position.
Figure 7:
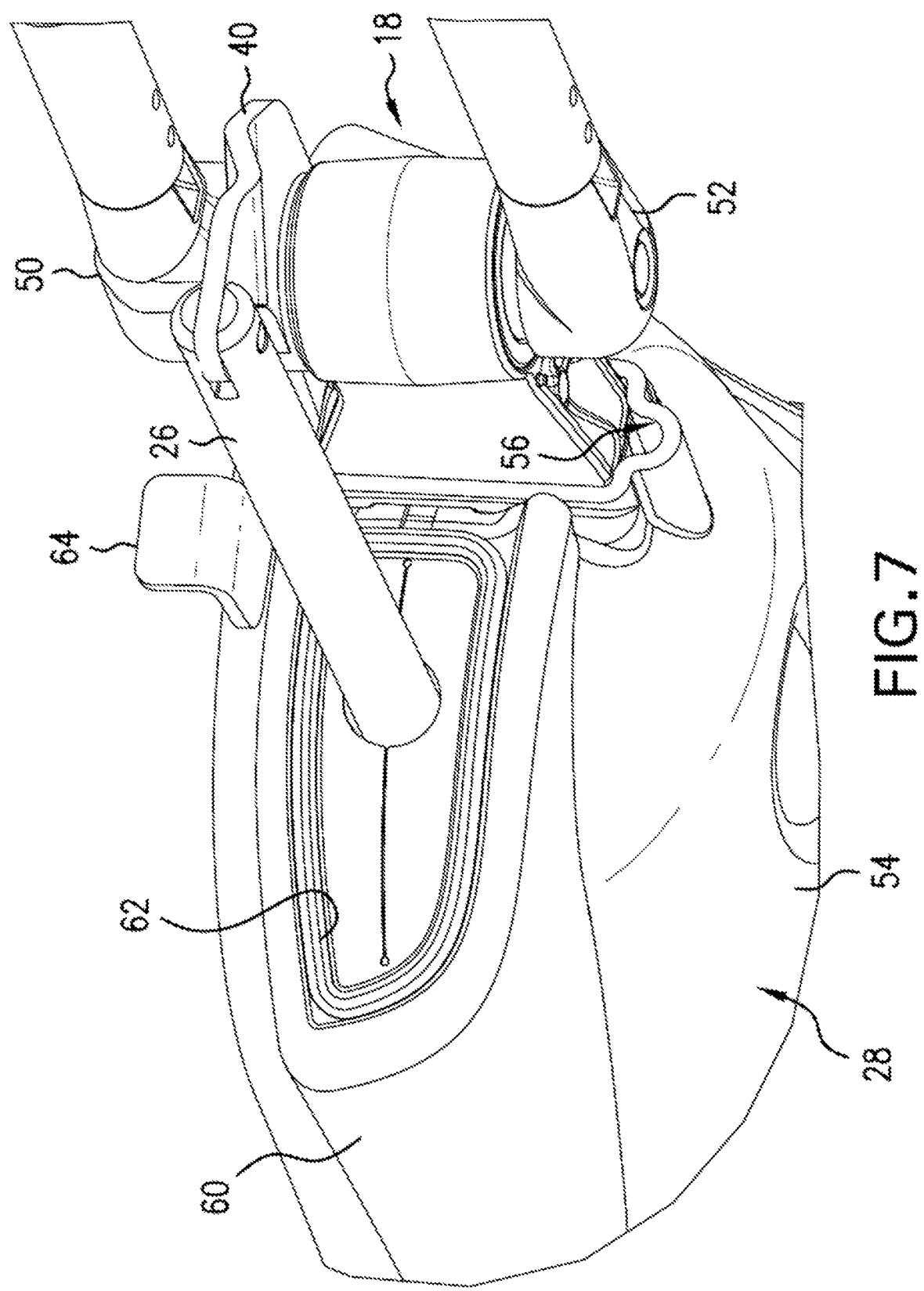
FIG. 7 is a perspective view of the cover of the retractable mirror assembly.

The protective cover 28 may protect at least a portion of the elongated support beam 16 and/or actuator 26. The protective cover 28 may be fastened to the elongated support beam 16 via one or more fasteners. The protective cover 28 may include a shell body 54 with a receiving slot 56 for receiving the elongated support beam 16 and a receiving hole 58 for receiving the actuator 26 (FIGS. 1 and 7). The protective cover 28 may also include a hole cover member 60 connected to the receiving hole 58 and a seal member 62 connected to the hole cover member 60 for sealably surrounding the actuator 26. The seal member 62 may include a hole and/or a slit. The protective cover 28, and any member thereof, may comprise any desired material, such as metal, plastic, and/or rubber. As can be appreciated, the mirror assembly 10 may also include additional protective covers, not shown herein, for protecting other portions of the elongated support beam 16 and/or actuator 26.

The ECU 30 is operably connected to the actuator 26 and the user interface 34. The operator may input a command for retracting or extending the mirrors 22, 24 into the user interface 34, which then sends a corresponding control signal to the ECU 30 so that the ECU 30 correspondingly retracts or extends the actuator 26. The ECU 30 may be in the form of any desired controller 30. The ECU 30 may be a separate device or incorporated into the existing control system(s) of the work vehicle 12. The user interface 34 may be an analog device, for example a button or switch, and/or an electronic device. It is conceivable to incorporate one or more sensors, such as a position sensor within the actuator 26, to thereby communicate a position of the mirrors 22, 24 and/or actuator 26 to the ECU 30.

According to another aspect of the present invention, the mirror assembly 10 may include a mechanical stop 64 that is connected to the top and/or side of the end of the elongated support beam 16. The mechanical stop 64 limits an inward rotation of the at least one support arm 20 by way of abutting the at least one support 20 and preventing further rotation thereof. The mechanical stop 64 may include a rear plate portion fastened to the elongated support beam 16, a curved middle portion, and a bent end tab for contacting the at least one support arm 20 (unnumbered).

Figure 5:
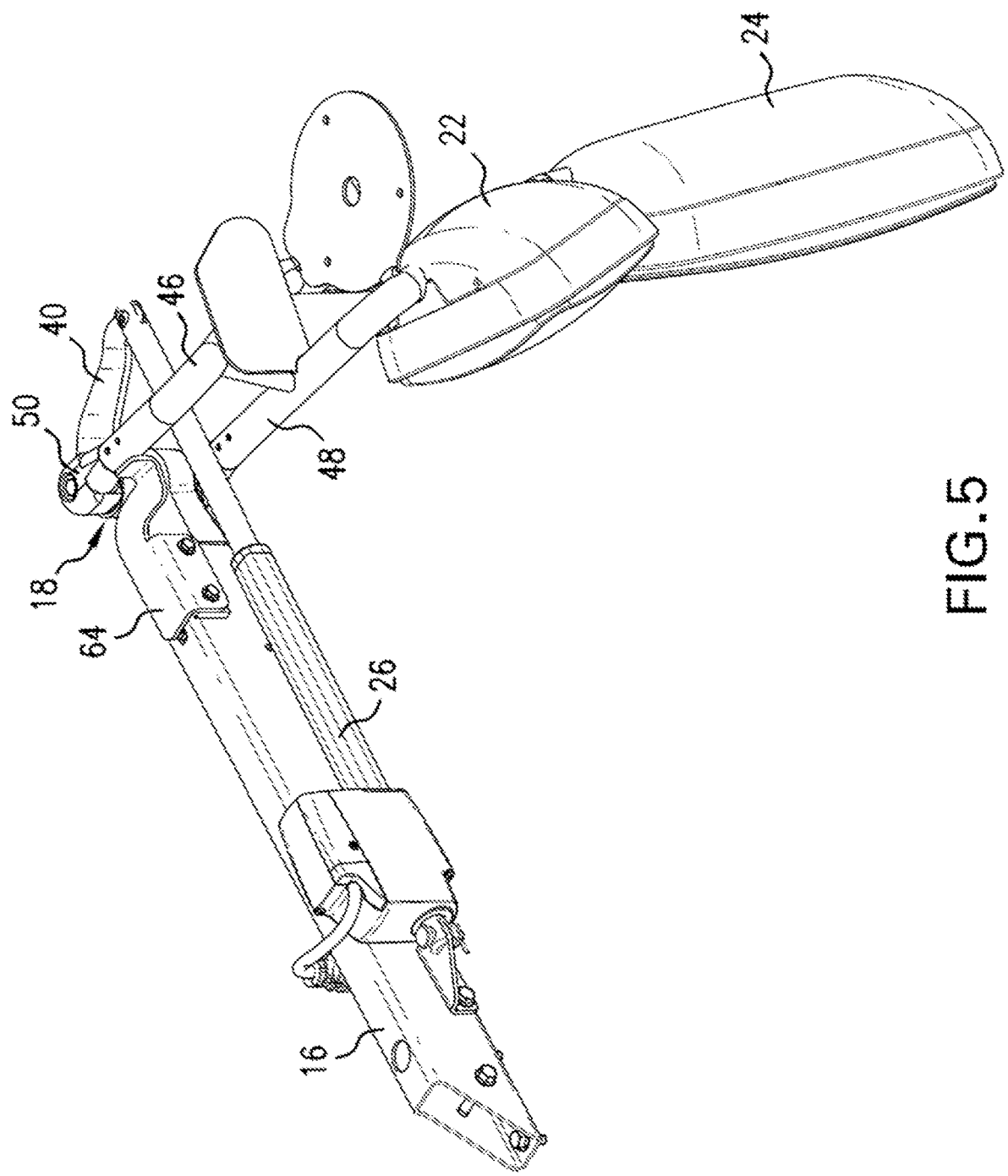
FIG. 5 is a perspective view of the retractable mirror assembly in which the actuator is extended but the mirror is completely retracted due to the force from an object contacting the mirror when forwardly driving the agricultural vehicle.
Figure 6:
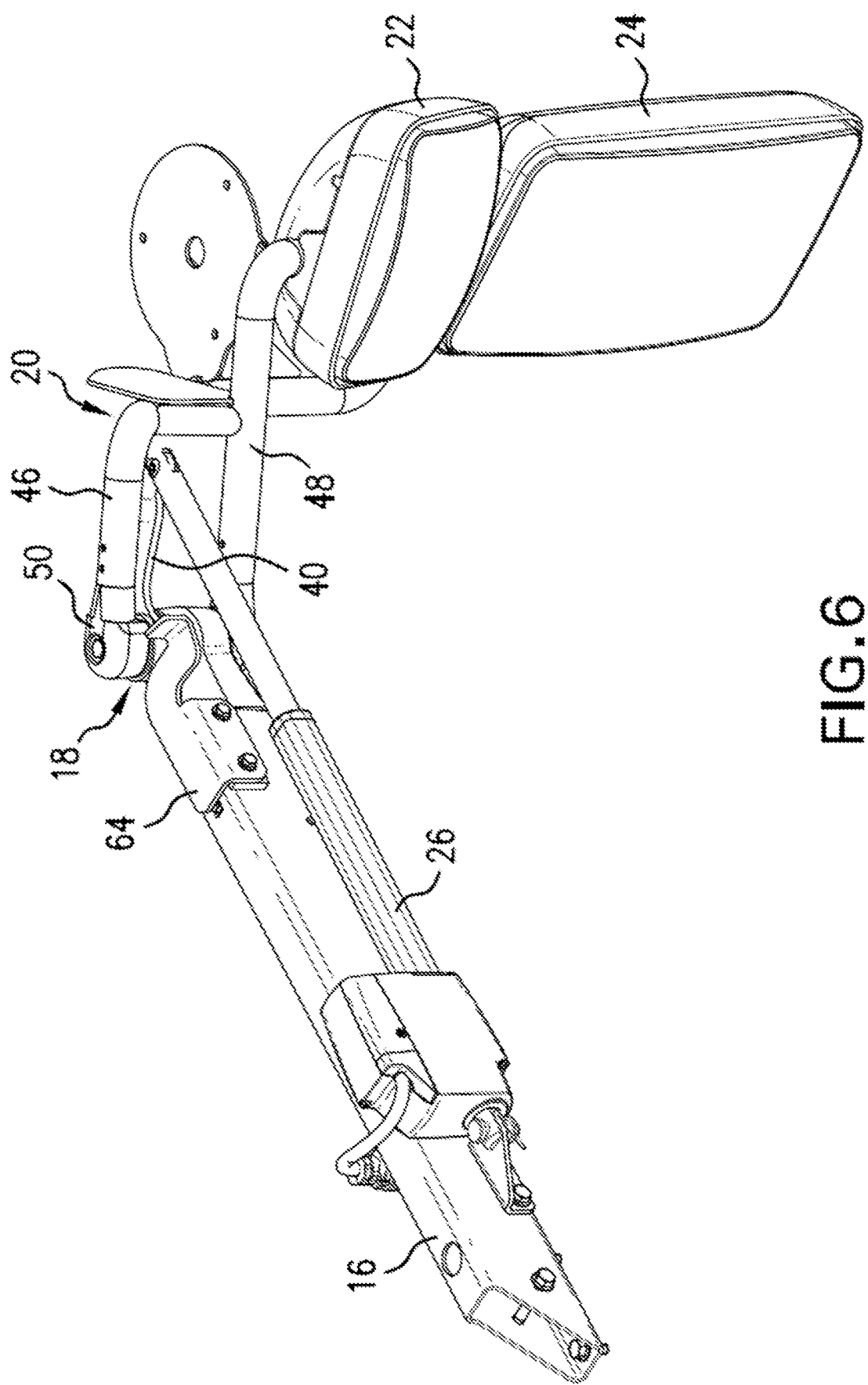
FIG. 6 is a perspective view of the retractable mirror assembly in which the actuator is extended but the mirror is partially retracted due to the force from the object.

Referring now to FIGS. 5-6, and according to another aspect of the present invention, the mirror assembly 10 may further include a reset function which automatically resets the mirrors 22, 24 to be in their operating position after being undesirably moved. For example, when the work vehicle 12 is forwardly driven and the mirror(s) 22, 24 hit(s) an object, such as a branch or other obstacle, the mirrors 22, 24 will retract backwards due to the detent joint 18. As a result thereof, the mirrors 22, 24 could be fully retracted (FIG. 5) or partially retracted (FIG. 6). Yet, in either case, the actuator 26 will remain extended. Thus, since the actuator 26 is still extended, a double-action reset procedure may be required to reset mirrors 22, 24 back into their functional operating position. First, the actuator 26 may be retracted, completely or partially. For example, the actuator 26 may be retracted until the mirrors 22, 24 and/or support arm 20 contacts the mechanical stop 64, or the side of the work vehicle 12, so that the relative position of the mirrors 22, 24 with respect to the actuator 26 is reset, i.e., the original retracted position of the actuator 26 and mirrors 22, 24. Second, the actuator 26 may be extended again to reposition the mirrors 22, 24 to their desired operating position, before the mirrors 22, 24 came into contact with the object. It should be appreciated that the reset function may work in only one direction.

It is to be understood that the steps of the reset procedure, or any other procedure, may be manually or automatically performed by the ECU 30 upon loading and executing software code or instructions which are tangibly stored on the memory 32, e.g. a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the ECU 30 described herein is implemented in software code or instructions which are tangibly stored on a tangible computer readable medium 32. The ECU 30 loads the software code or instructions via a direct interface with the computer readable medium or via a wired and/or wireless network. Upon loading and executing such software code or instructions by the ECU 30, the ECU 30 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mirror assembly for a work vehicle, comprising:
   an elongated support beam having an end;
   a detent joint connected to the end of the elongated support beam and defining an axis of rotation, the detent joint including a detent bracket which is rotatable about the axis of rotation;
   at least one support arm rotationally connected to the detent joint;
   at least one mirror connected to the at least one support arm; and
   an actuator for adjusting a position of the at least one mirror relative to the elongated support beam, the actuator being connected in between the elongated support beam and the detent bracket such that the at least one support arm is rotatable about the axis of rotation by the actuator.

2. The mirror assembly of claim 1, wherein the actuator is a linear actuator which comprises a first end connected to the elongated support beam and a second end connected to the detent joint such that as the actuator extends and retracts the at least one support arm rotates about the axis of rotation.

3. The mirror assembly of claim 1, wherein the actuator is operable in a reset mode for resetting an operating position of the at least one mirror after the at least one mirror and the at least one support arm are undesirably moved, and in the reset mode the actuator performs a double-action reset procedure by initially retracting to reset a relative position of the at least one support arm relative to the actuator and subsequently extending to reposition the operating position of the at least one mirror.

4. The mirror assembly of claim 1, wherein the detent joint further comprises a joint body, a rod, and at least one detent element internally disposed within the joint body.

5. The mirror assembly of claim 4, wherein the detent bracket comprises a first end for mating with the at least one detent element and a receiving hole for receiving the rod and connecting to the joint body, an elongated middle portion, and a second end that is connected to the actuator.

6. The mirror assembly of claim 5, wherein the detent bracket is connected in between the joint body and the at least one support arm.

7. The mirror assembly of claim 4, wherein the rod of the detent joint comprises a receiving hole and the at least one support arm is fastened to the rod.

8. The mirror assembly of claim 1, further comprising a mechanical stop connected to the elongated support beam and configured for limiting an inward rotation of the at least one support arm.

9. The mirror assembly of claim 8, wherein the mechanical stop is connected to the end of the elongated support beam and comprises a curved middle portion and a bent end tab for contacting the at least one support arm.

10. The mirror assembly of claim 1, wherein the at least one mirror comprises a first mirror and a second mirror, and wherein the at least one support arm comprises a multi-part support arm with an upper support arm member connected to the second mirror and a lower support arm member connected to the first mirror.

11. The mirror assembly of claim 1, wherein the actuator is an electric cylinder.

12. The mirror assembly of claim 1, further comprising a protective cover for housing and protecting at least a portion of the actuator and the elongated support beam.

13. The mirror assembly of claim 12, wherein the protective cover comprises a shell body with a receiving slot for receiving the elongated support beam and a receiving hole for receiving the actuator.

14. The mirror assembly of claim 13, wherein the protective cover further comprises a hole cover member connected to the receiving hole and a seal member connected to the hole cover member for sealably surrounding the actuator.

15. The mirror assembly of claim 1, further comprising an electronic control unit operably connected to the actuator and an user interface operably connected to the electronic control unit, the user interface is configured for receiving an input command and sending a control signal to the electronic control unit, and the at least one mirror is automatically adjusted by the electronic control unit upon receiving the control signal.

* * * * *